(12) United States Patent
Ho

(10) Patent No.: US 10,281,000 B2
(45) Date of Patent: May 7, 2019

(54) VARIABLE DAMPING ASSEMBLY AND AIR FILTERING DEVICE HAVING THE SAME

(71) Applicant: Chiun Mai Communication Systems, Inc., New Taipei (TW)

(72) Inventor: Ming-Chun Ho, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 88 days.

(21) Appl. No.: 15/585,145

(22) Filed: May 2, 2017

(65) Prior Publication Data

US 2017/0321782 A1  Nov. 9, 2017

(30) Foreign Application Priority Data

May 9, 2016 (CN) .......................... 2016 1 0301250

(51) Int. Cl.
| | |
|---|---|
| F16F 13/00 | (2006.01) |
| F16F 7/00 | (2006.01) |
| F16F 1/12 | (2006.01) |
| B01D 46/00 | (2006.01) |
| D06F 37/20 | (2006.01) |
| F16F 15/02 | (2006.01) |
| F16F 7/02 | (2006.01) |
| D06F 37/26 | (2006.01) |

(52) U.S. Cl.
CPC ........ F16F 15/022 (2013.01); *B01D 46/0005* (2013.01); *B01D 2265/024* (2013.01); *D06F 37/20* (2013.01); *D06F 37/268* (2013.01); *F16F 7/023* (2013.01); *F16F 13/005* (2013.01); *F16F 2222/04* (2013.01)

(58) Field of Classification Search
CPC ........ F16F 15/022; F16F 13/005; F16F 7/023; F16F 7/06; F16F 2222/04; B01D 46/0005; B01D 2265/024; D06F 37/20; D06F 37/268; D06F 37/22
USPC ....... 248/562, 564, 566, 580, 610, 617, 619, 248/636, 638; 68/3 R
See application file for complete search history.

(56) References Cited

U.S. PATENT DOCUMENTS

| | | | | |
|---|---|---|---|---|
| 2,568,402 A | * | 9/1951 | Lynn ....................... | B61F 5/24 105/164 |
| 3,349,425 A | * | 10/1967 | Reabelos ............... | A47B 91/04 16/44 |
| 4,773,123 A | * | 9/1988 | Yu .......................... | A45C 5/146 16/34 |
| 6,473,935 B1 | * | 11/2002 | Cherukuri ........... | B60B 33/0005 16/33 |
| 6,594,856 B1 | * | 7/2003 | Cherukuri ........... | B60B 33/0005 16/32 |

(Continued)

*Primary Examiner* — Tan Le
(74) *Attorney, Agent, or Firm* — ScienBiziP, P.C.

(57) ABSTRACT

A variable damping assembly includes a base, a supporting member, a damping member, and an elastic member. The supporting member is positioned on the base. The damping member is rotatably coupled to the supporting member and presses against the housing. The elastic member includes a first end and a second end opposite to the first end. The first end of the elastic member is coupled to the supporting member and the second end of the elastic member is coupled to the housing. The elastic member provides an elastic force and the damping member provides a damping force changed as the elastic force changes.

16 Claims, 5 Drawing Sheets

(56) References Cited

U.S. PATENT DOCUMENTS 7,195,322 B2 *   3/2007   Lin .......................... A45C 5/14
                                                    190/18 A

* cited by examiner
VARIABLE DAMPING ASSEMBLY AND AIR FILTERING DEVICE HAVING THE SAME

CROSS-REFERENCE TO RELATED DISCLOSURES

This disclosure claims priority to Chinese Patent Application No. 201610301250.8 filed on May 9, 2016, the contents of which are incorporated by reference herein.

FIELD

The subject matter herein generally relates to a variable damping assembly and an air filtering device having the variable damping assembly.

BACKGROUND

Air filtering devices are widely used. An air filtering device normally includes a base, a housing sleeved on the base, and a filter positioned inside the base. However, when the filter needs to be changed, the housing maybe removed from the base manually, which is inconvenient.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
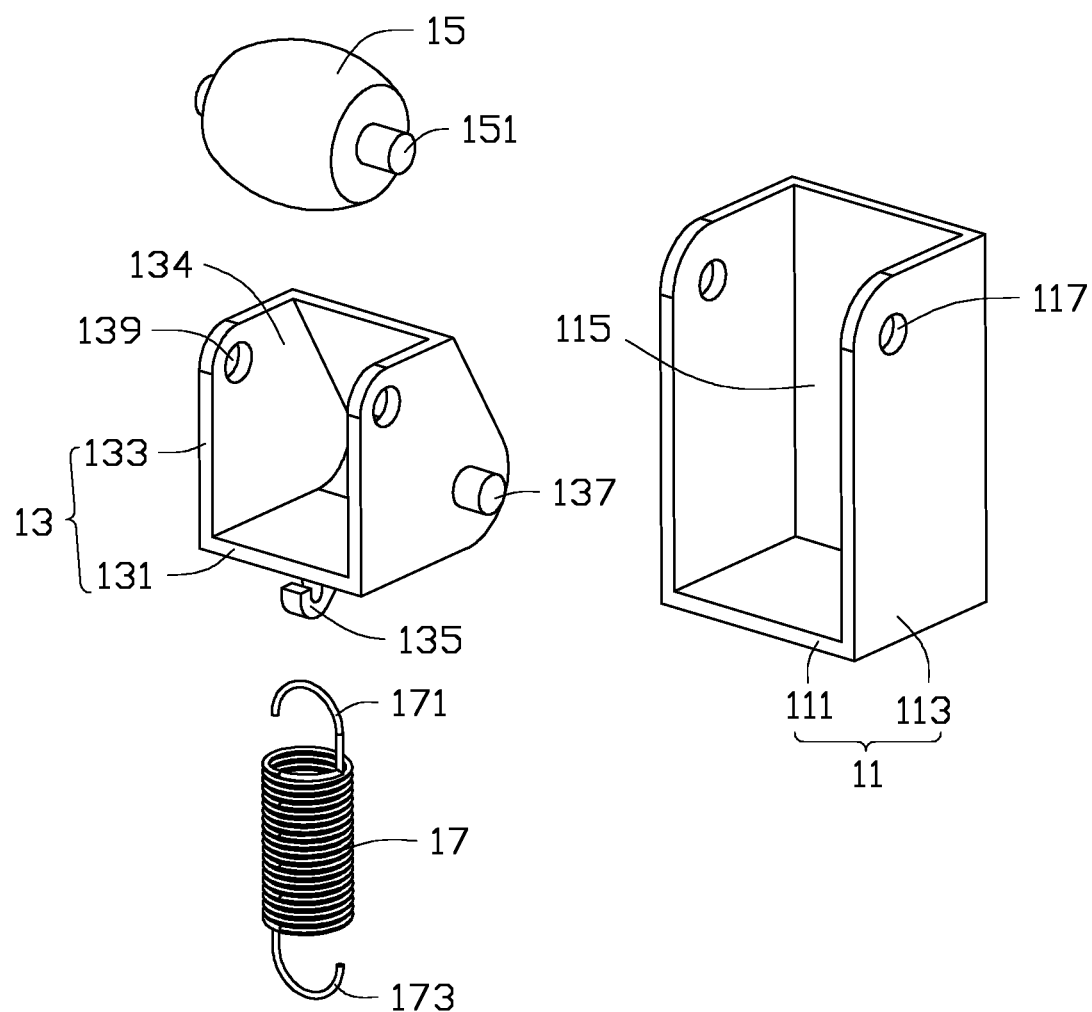
FIG. 1 is an exploded, isometric view of a variable damping assembly according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a variable damping assembly 100. The variable damping assembly 100 includes a base 11, a supporting member 13, a damping member 15, and an elastic member 17.

The base 11 is configured to assemble and support the supporting member 13. The base 11 includes a bottom board 111 and two side boards 113. In this exemplary embodiment, the bottom board 111 is substantially rectangular. The two side boards 113 are parallel to and spaced apart from each other. The two side boards 113 are positioned at two sides of the bottom board 111. In this exemplary embodiment, the two side boards 113 perpendicularly extend from two sides of the bottom board 111 to cooperatively form a receiving space 115 with the bottom board 111. Each side board 113 has a surface facing toward the other side board 113 and the surface defines a supporting hole 117 thereon. In this exemplary embodiment, the supporting hole 117 can be a through hole passing through each side board 113 or a blind hole partially passing through each side board 113.

Figure 2:
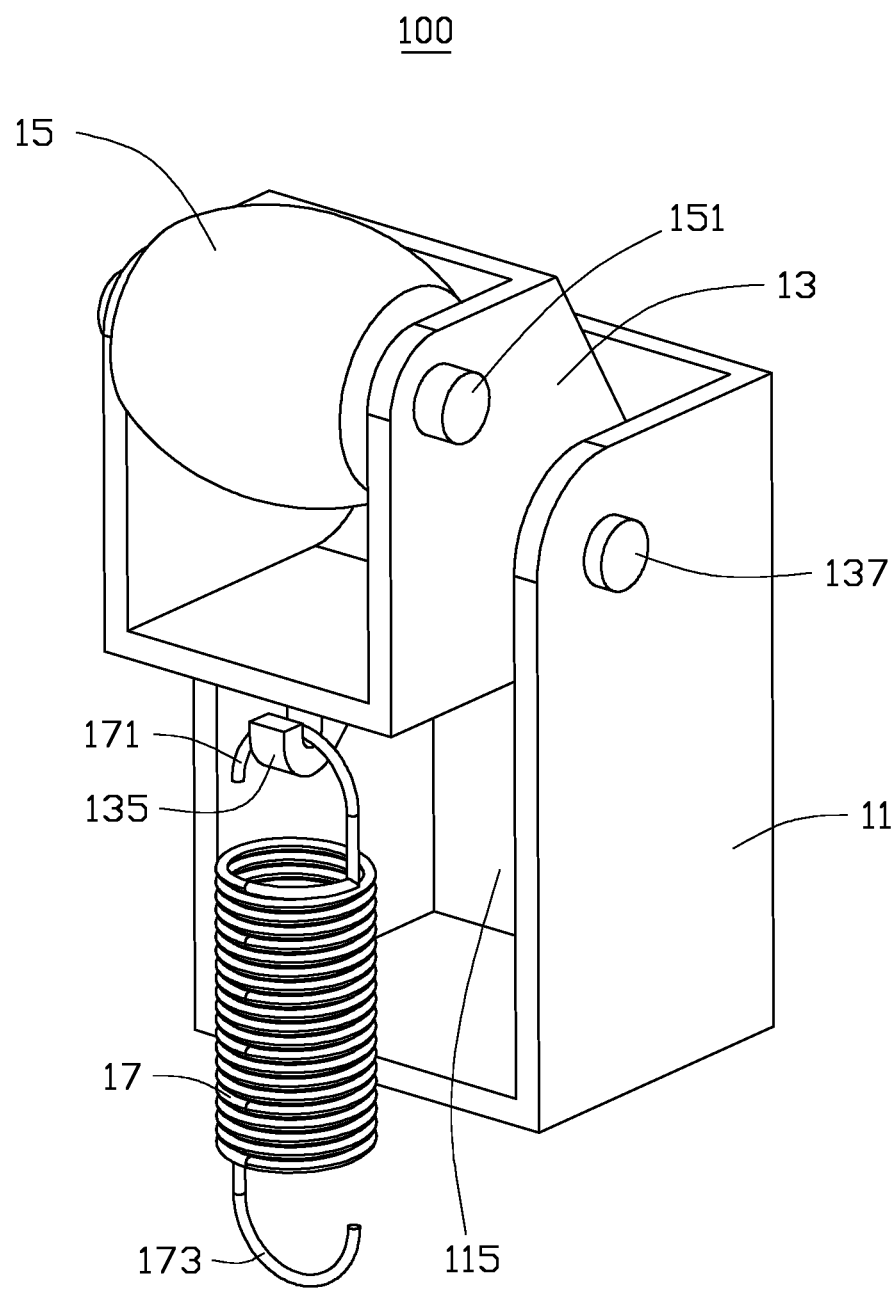
FIG. 2 is an assembled, isometric view of the variable damping assembly of FIG. 1.

As illustrated in FIG. 2, the supporting member 13 is substantially a frame and is positioned in the receiving space 115. The supporting member 13 includes a bottom wall 131 and two sidewalls 133. The bottom wall 131 is substantially rectangular. The two sidewalls 133 are positioned at two sides of the bottom wall 131. In this exemplary embodiment, the two sidewalls 133 perpendicularly extend from two sides of the bottom wall 131 to cooperatively form a rotating space 134 with the bottom wall 131.

The bottom wall 131 includes a hook 135 protruding away from the sidewalls 133 from a surface of the bottom wall 131. Each sidewall 133 has a surface facing away from the other sidewall and the surface facing away has an assembling portion 137, for example, an assembling rod, protruding therefrom. Each assembling portion 137 can pass through one supporting hole 117 of the base 11, then the supporting member 13 is assembled to the receiving space 115 and the supporting member 13 is partially exposed from the receiving space 115. That is, the supporting member 13 is partially received in the receiving space 115, for example, the hook 135 of the supporting member 13 is not received in the receiving space 115. Each sidewall 133 further defines a pivot hole 139.

In this exemplary embodiment, the damping member 15 is a roller or other rolling member. The damping member 15 is rotatably positioned in the rotating space 134 of the supporting member 13. The damping member 15 has two ends, each end has a shaft 151 protruding therefrom along an axial direction of the damping member 15. Each shaft 151 passes through and is received in one pivot hole 139 so that the damping member 15 is assembled in the rotating space 134 and can rotate about the shaft 151.

In other exemplary embodiments, a location of the shaft 151 and a location of the pivot hole 139 can be exchanged. For example, the two shafts 151 can protrude from two sides of the sidewall 133 and the pivot holes 139 can be defined on two ends of the damping member 15.

In other exemplary embodiments, the damping member 15 can be rotatably coupled to the supporting member 13 through other methods. For example, the damping member 15 has two ends, each end defines an axial hole. The shaft 151 passes through one pivot hole 139 and one axial hole, then the damping member 15 is rotatably coupled to the supporting member 13. In other exemplary embodiments, the pivot hole 139 can also be a through hole passing through the two sidewalls 133 or a blind hole partially passing through the two sidewalls 133.

The elastic member 17 can be a torsion spring, a spring, a tension spring, or other elastic component. In this exemplary embodiment, the elastic member 17 is a tension spring. The elastic member 17 includes a first mounting portion 171 and a second mounting portion 173. The first mounting portion 171 is positioned at a first end of the elastic member 17. The first mounting portion 171 is latched on the hook 135 of the supporting member 13, then the first end of the elastic member 17 is mounted to the supporting member 13. The second mounting portion 171 is positioned at a second end of the elastic member 17 facing away from the first mounting portion 171.

Figure 3:
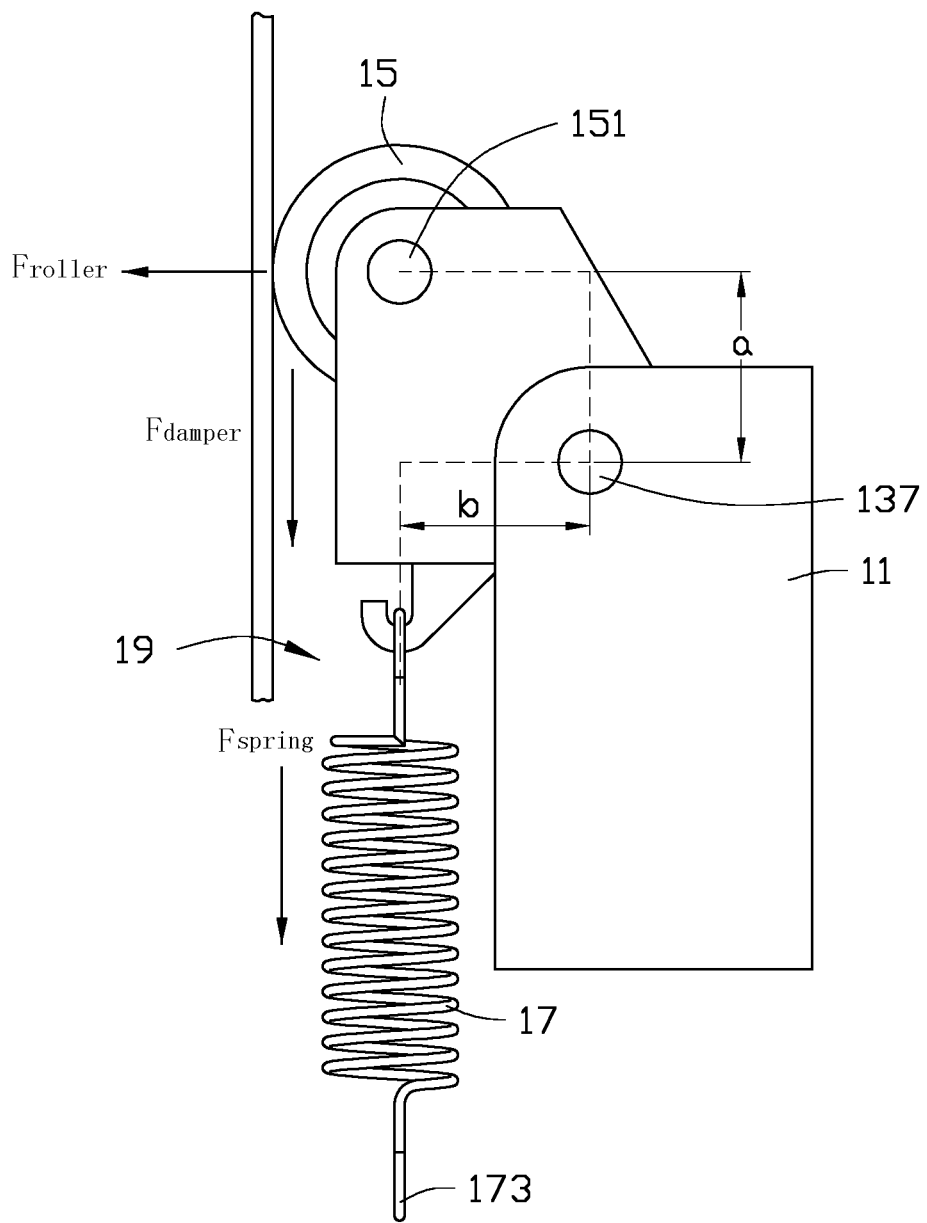
FIG. 3 is a schematic diagram of the variable damping assembly of FIG. 1, showing a relationship among a damping force, an elastic force, and a pressing force.
Figure 4:
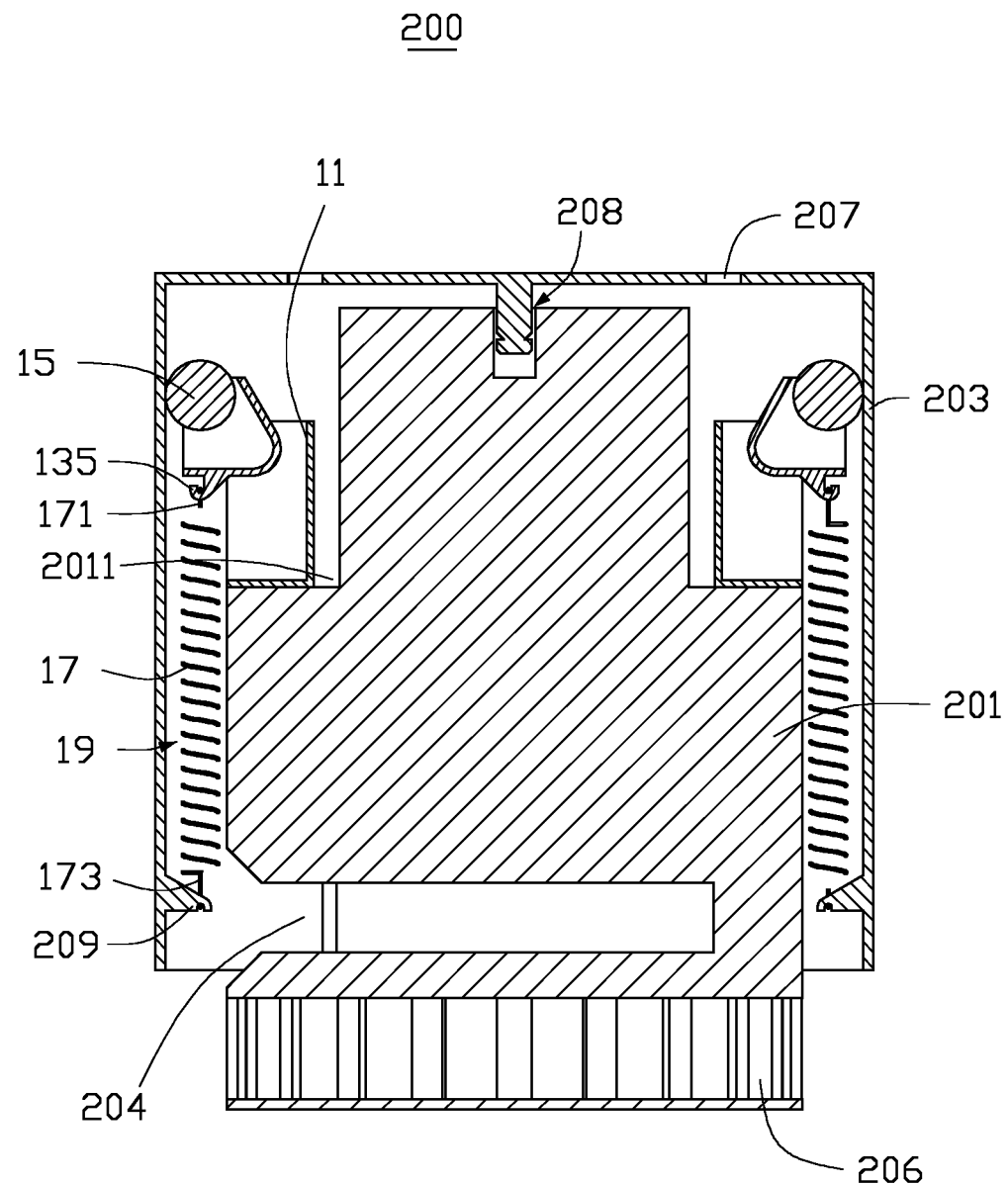
FIG. 4 is a diagram showing the variable damping assembly of FIG. 1 applied to an air filtering device and a state where a housing of the air filtering device is not lifted up according to an exemplary embodiment of the present disclosure.

FIG. 3 and FIG. 4 illustrate that the variable damping assembly 100 can be assembled in an object, for example, an inner wall of a housing. First, the damping member 15 presses against the inner wall of the housing and generates a pressing force $F_{roller}$ towards the housing. The damping member 15 presses against the inner wall of the housing and the supporting member 13 is partially received in the receiving space 115. The base 11 is spaced apart from the housing, thereby forming a moving space 19. Next, the second mounting portion 173 of the elastic member 17 is fixed to the inner wall of the housing. Since the supporting member 13 is partially received in the receiving space 115, the hook 135 and the first end of the elastic member 17 latched on the hook 135 are exposed from the receiving space 115. Then the elastic member 17 is positioned in the moving space 19 and can move up and down in the moving space 19 to accumulate elastic potential energy, for example, the elastic member 17 is in a stretching state. Since the second mounting portion 173 is fixed to the inner wall of the housing, when the elastic member 17 releases the accumulated elastic potential energy, the first mounting portion 171 of the elastic member 17 moves towards the second mounting portion 173. That is, the elastic member 17 restores to an original state to generate an elastic force $F_{spring}$ to the damping member 15.

Since the damping member 15 presses against the inner wall of the housing, the damping member 15 further generates a damping force $F_{damper}$ to the inner wall of the housing. A direction of the damping force $F_{damper}$ remains consistent with a direction of the elastic force $F_{spring}$ and is substantially perpendicular to a direction of the pressing force $F_{roller}$. The elastic force $F_{spring}$ and the damping force $F_{damper}$ cooperatively control the damping member 15 to move down, that is, the damping member 15 moves down relative to the object, and the object moves up. In this exemplary embodiment, the damping force $F_{damper}$ and the pressing force $F_{roller}$ satisfy a formula (1):

$$F_{damper} = F_{roller} * \mu \quad (1)$$

In formula (1), the parameter "$\mu$" is a system friction coefficient between the damping member 15 and the object.

According to a principle of moment balance, the pressing force $F_{roller}$ and the elastic force $F_{spring}$ satisfy a formula (2):

$$F_{roller} * a = F_{spring} * b \quad (2)$$

In formula (2), the parameter "a" is a force arm of the pressing force $F_{roller}$, the parameter "b" is a force arm of the elastic force $F_{spring}$. In this exemplary embodiment, the parameter "a" is equal to a vertical distance from the pressing force $F_{roller}$ to the assembling portion 137. The parameter "b" is equal to a vertical distance from the elastic force $F_{spring}$ to the assembling portion 137.

Then, according to the formula (1) and formula (2), the damping force $F_{damper}$ and the elastic force $F_{spring}$ satisfy a formula (3):

$$F_{damper} = \frac{F_{spring} * b}{a} * \mu \quad (3)$$

Due to the system friction coefficient "$\mu$", the force arm "a", and the force arm "b" are all constant, the damping force $F_{damper}$ is in direct proportion to the elastic force $F_{spring}$, that is, the damping force $F_{damper}$ is changed according to the change of the elastic force $F_{spring}$. When the elastic force $F_{spring}$ is changed, the damping force $F_{damper}$ is variable. In this exemplary embodiment, the damping force $F_{damper}$ is always less than the elastic force $F_{spring}$ and the damping force $F_{damper}$ is changed following a change in the elastic force $F_{spring}$. When the elastic member 17 releases the accumulated elastic potential energy, the elastic force $F_{spring}$ of the elastic member 17 can be changed with a length of the elastic member 17 and generates a variable damping force $F_{damper}$. The variable damping force $F_{damper}$ continues to lift up the object at nearly a constant speed and the object will not bounce up rapidly.

Figure 5:
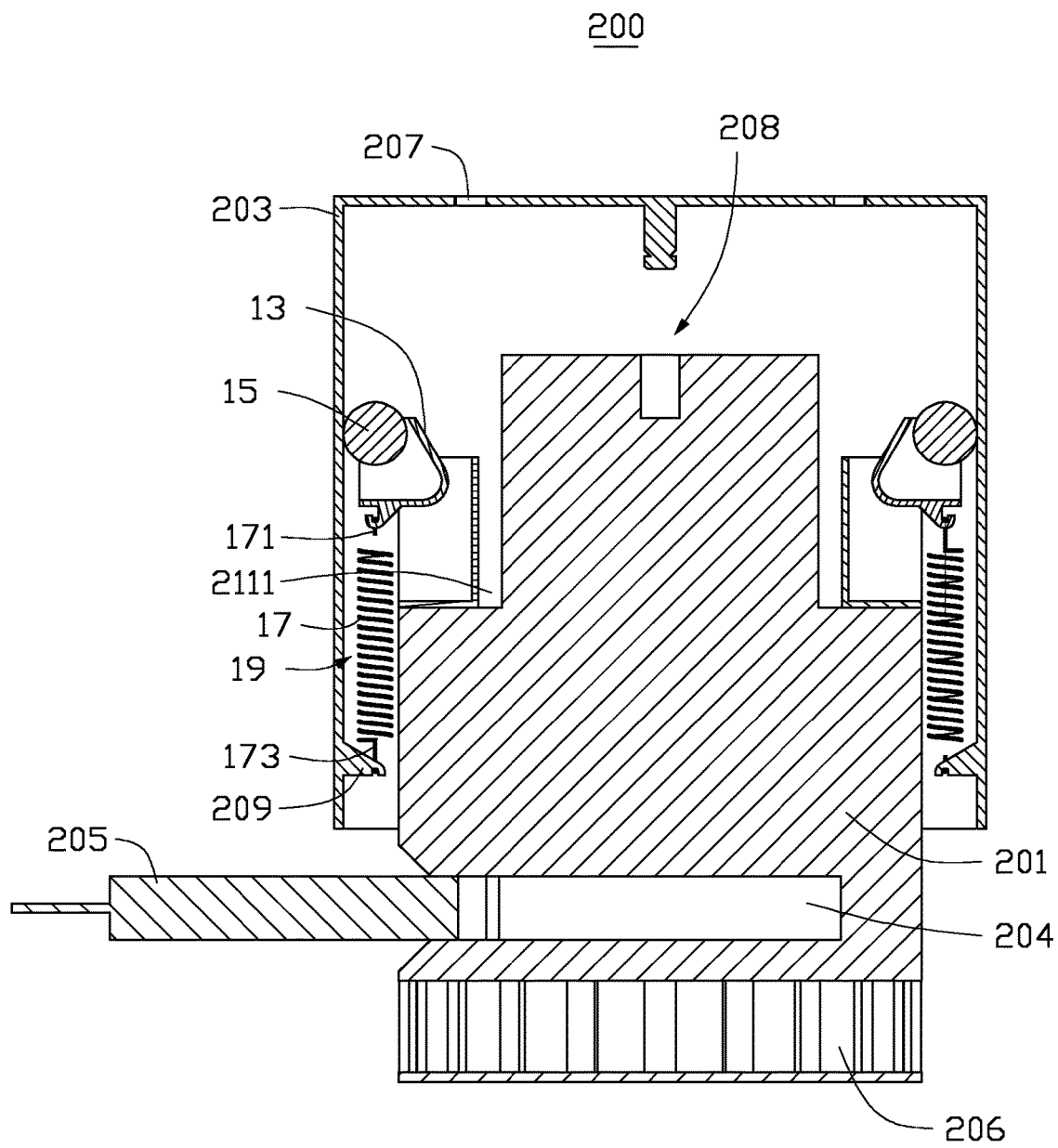
FIG. 5 is similar to FIG. 4 showing the housing of the air filtering device is lifted up.

FIG. 4 and FIG. 5 illustrate that the variable damping assembly 100 is applied to an air filtering device 200. In this exemplary embodiment, the air filtering device 200 includes a main body 201 and a housing 203. The housing 203 is sleeved on the main body 201. The housing 203 has an inner wall that is spaced apart from the main body 201. The variable damping assembly 100 is assembled in the housing 203. A periphery wall of the main body 201 defines a slot 2011. The base 11 of the variable damping assembly 100 is positioned on a bottom surface of the slot 2011 and the main body 201 supports the base 11. The damping member 15 of the variable damping assembly 100 presses against the inner wall of the housing 203, the base 11 and the inner wall of the housing 203 cooperatively form the moving space 19. The elastic member 17 is positioned in the moving space 19. The first mounting portion 171 is latched on the hook 135 of the supporting member 13. The second mounting portion 173 of the elastic member 17 is fixed to the inner wall of the housing 203. In this exemplary embodiment, the elastic member 17 is in the stretching state to accumulate elastic potential energy. When the elastic member 17 releases the accumulated elastic potential energy, since the second mounting portion 173 is fixed to the inner wall of the housing 203, the first mounting portion 171 of the elastic member 17 moves towards the second mounting portion 173. That is, the elastic member 17 restores to an original state to generate an elastic force $F_{spring}$ to the damping member 15. Since the damping member 15 presses against the inner wall of the housing 203, the damping member 15 generates a damping force $F_{damper}$ to the inner wall of the housing 203. The elastic force $F_{spring}$ and the damping force $F_{damper}$ cooperatively control the housing 203 to move up relative to the main body 201, which facilitate the removal of the housing 203 from the main body 201.

In this exemplary embodiment, the main body 201 is substantially a cylinder. A periphery wall of the main body 201 defines a receiving portion 204 for receiving a filtering portion 205, for example, a filter element or other filtering structure. When the elastic force $F_{spring}$ and the damping force $F_{damper}$ cooperatively control the housing 203 to move up relative to the main body 201, the receiving portion 204 can be exposed, which facilitates removal of the filtering portion 205.

In other exemplary embodiments, a periphery wall of the main body 201 away from the housing 203 and a periphery wall of the receiving portion 204 together define a plurality of air inlets 206. A top portion of the housing 203 away from the main body 201 defines a plurality of air outlets 207. Then, air can enter into the main body 201 from the air inlets 206, be filtered by the filtering portion 205, and output from the air outlets 207.

In other exemplary embodiments, the air filtering device 200 further includes a latching member 208. The latching member 208 is configured to latch the main body 201 and the housing 203 such that the elastic member 17 accumulates elastic potential energy. When the latching member 208 is unlatched, the elastic member 17 releases the accumulated elastic potential energy, the housing 203 lifts up, which removes or changes the housing 203 and/or removes or changes the filtering portion 205.

In other exemplary embodiments, the housing 203 further includes a connecting portion 209, for example, a hook. The connecting portion 209 is positioned at the inner wall of the housing 203 and is configured to latch with the second mounting portion 173 of the elastic member 17, then the second mounting portion 173 of the elastic member 17 is fixed to the inner wall of the housing 203.

When the variable damping assembly 100 is applied to the air filtering device 200, a number of the variable damping assembly 100 is not limited to be one and can be adjusted according to user's need, for example, the air filtering device 200 includes a plurality of variable damping assemblies 100.

When the air filtering device 200 is substantially circular, the air filtering device 200 includes three variable damping assemblies 100. The three variable damping assemblies 100 form three vertices of a triangle to ensure the housing 203 lifts up stably and efficiently.

When the air filtering device 200 is substantially rectangular, the air filtering device 200 includes four variable damping assemblies 100. Each of the four variable damping assemblies 100 is positioned at one inner wall of the housing 203 for ensuring the housing 203 can be lift up stably and efficiently.

In other exemplary embodiments, the variable damping assembly 100 is not limited to be applied to the air filtering device 200, the variable damping assembly 100 can also be applied to other devices similar to the air filtering device 200.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A variable damping assembly in a housing of a device, the variable damping assembly comprising:
   a base;
   a supporting member positioned on the base;
   a damping member, the damping member rotatably coupled to the supporting member and pressed against the housing; and
   an elastic member comprising a first end and a second end opposite to the first end, the first end of the elastic member coupled to the supporting member, and the second end of the elastic member coupled to the housing;
   wherein the elastic member provides an elastic force and the damping member provides a damping force changed as the elastic force changes; and wherein the supporting member comprises a hook, the first end of the elastic member comprises a first mounting portion, the first mounting portion is latched to the hook, the second end of the elastic member comprises a second mounting portion, the second mounting portion is fixed to the housing.

2. The variable damping assembly of claim 1, wherein a direction of the damping force is the same with a direction of the elastic force.

3. The variable damping assembly of claim 2, wherein when the damping member presses against the housing, the damping member provides a pressing force, the damping force and the elastic force satisfy a formula of $$F_{damper} = \frac{F_{spring} * b}{a} * \mu,$$

wherein the parameter "$F_{damper}$" is the damping force, the parameter "$F_{spring}$" is the elastic force, the parameter "a" is a force arm of the pressing force, the parameter "b" is a force arm of the elastic force, and the parameter "$\mu$" is a system friction coefficient between the damping member and the object.

4. The variable damping assembly of claim 1, wherein the damping force is less than the elastic force.

5. The variable damping assembly of claim 1, wherein the base comprises a bottom board and two side boards, the two side boards perpendicularly extend from two sides of the bottom board to cooperatively form a receiving space with the bottom board, the supporting member is partially received in the receiving space.

6. The variable damping assembly of claim 5, wherein each side board has a surface facing toward the other side board and the surface defines a supporting hole, the supporting member comprises a bottom wall and two sidewalls and the two sidewalls perpendicularly extend from two sides of the bottom wall, each sidewall of the supporting member has a surface facing away from the other sidewall and the surface facing away comprises an assembling portion, each assembling portion passes through one supporting hole so that the supporting member is partially received in the receiving space.

7. The variable damping assembly of claim 6, wherein each sidewall of the supporting member defines a pivot hole, the damping member has two ends, each end of the damping member has a shaft protruding therefrom along an axial direction of the damping member, each shaft passes through and is received in one pivot hole so that the damping member is rotatably coupled to the supporting member.

8. An air filtering device comprising:
   a main body;
   a housing sleeved on the main body; and
   at least one variable damping assembly positioned inside the housing and comprising:
      a base;
      a supporting member positioned on the base;

a damping member, the damping member rotatably coupled to the supporting member and pressed against the housing; and an elastic member comprising a first end and a second end opposite to the first end, the first end of the elastic member coupled to the supporting member, and the second end of the elastic member coupled to the housing;

a latching member, the latching member latches the main body and the housing, when the latching member is unlatched, the damping member makes the housing to lift up relative to the main body; and wherein the elastic member provides an elastic force and the damping member provides a damping force changed as the elastic force changes, the elastic force and the damping force cooperatively control the housing to lift up relative to the main body.

9. The air filtering device of claim 8, wherein a periphery wall of the main body defines a receiving portion for receiving a filtering portion, when the housing lifts up relative to the main body, the receiving portion is exposed.

10. The air filtering device of claim 8, wherein a direction of the damping force is the same with a direction of the elastic force.

11. The air filtering device of claim 10, wherein when the damping member presses against the housing, the damping member provides a pressing force, the damping force and the elastic force satisfy a formula of $$F_{damper} = \frac{F_{spring} * b}{a} * \mu,$$

wherein the parameter "$F_{damper}$" is the damping force, the parameter "$F_{spring}$" is the elastic force, the parameter "a" is a force arm of the pressing force, the parameter "b" is a force arm of the elastic force, and the parameter "$\mu$" is a system friction coefficient between the damping member and the object.

12. The air filtering device of claim 8, wherein the damping force is less than the elastic force.

13. The air filtering device of claim 8, wherein the base comprises a bottom board and two side boards, the two side boards perpendicularly extend from two sides of the bottom board to cooperatively form a receiving space with the bottom board, the supporting member is partially received in the receiving space.

14. The air filtering device of claim 13, wherein each side board has a surface facing away toward the other side board and the surface defines a supporting hole, the supporting member comprises a bottom wall and two sidewalls and the two sidewalls perpendicularly extend from two sides of the bottom wall, each sidewall of the supporting member has a surface facing away from the other sidewall and the surface facing away comprises an assembling portion, each assembling portion passes through one supporting hole so that the supporting member is partially received in the receiving space.

15. The air filtering device of claim 14, wherein each sidewall of the supporting member defines a pivot hole, the damping member has two ends, each end of the damping member has a shaft protruding therefrom along an axial direction of the damping member, each shaft passes through and is received in one pivot hole so that the damping member is rotatably coupled to the supporting member.

16. The air filtering device of claim 8, wherein the supporting member includes a hook, the first end of the elastic member comprises a first mounting portion, the first mounting portion is latched to the hook, the second end of the elastic member comprises a second mounting portion, the second mounting portion is fixed to the housing.

* * * * *